(No Model.)
W. LYNCH.
GEARING FOR MOWERS AND REAPERS.
No. 375,172. Patented Dec. 20, 1887.
Fig. 3.
Fig. 1.
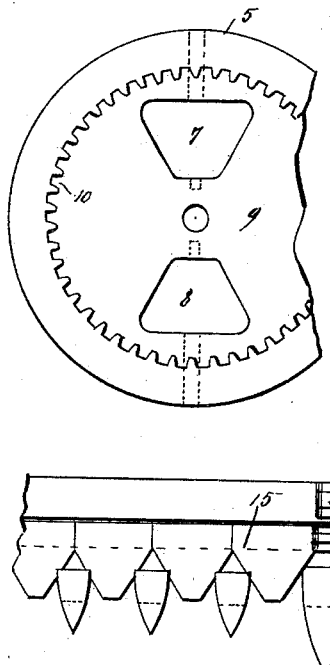
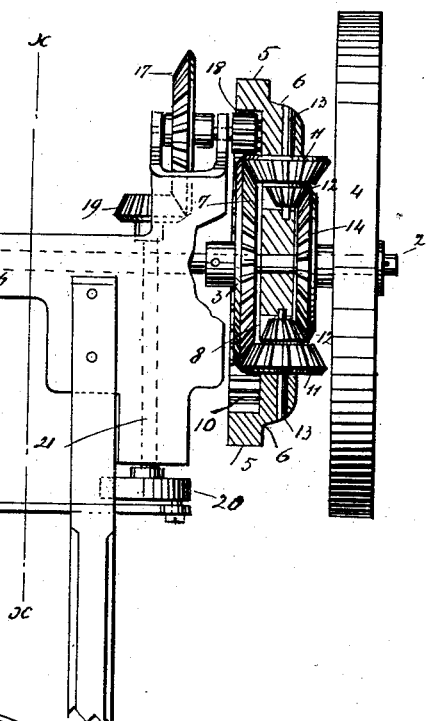
Fig. 2.
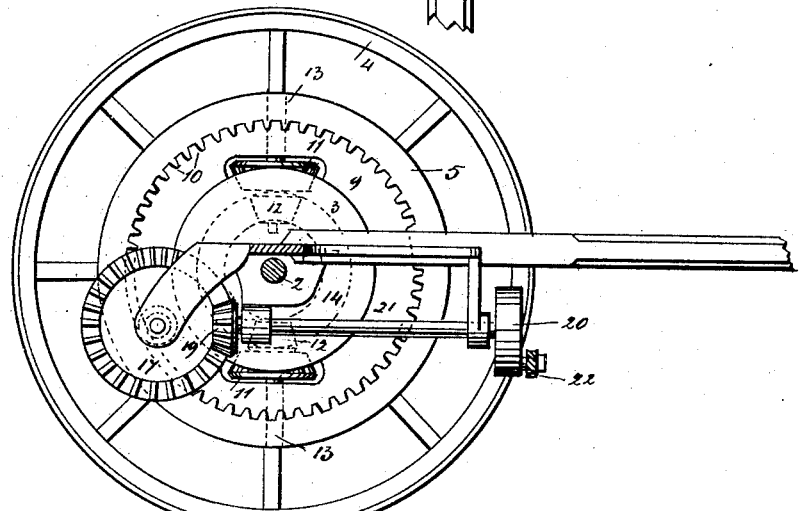
WITNESSES:
Chas. Nida
C. Sedgwick
INVENTOR:
W. Lynch
BY Munn & Co.
ATTORNEYS.
N. PETERS, Photo-Lithographer, Washington, D. C.

UNITED STATES PATENT OFFICE.

WILLIAM LYNCH, OF WALLKILL, NEW YORK.

GEARING FOR MOWERS AND REAPERS.

SPECIFICATION forming part of Letters Patent No. 375,172, dated December 20, 1887.

Application filed November 10, 1886. Serial No. 218,467. (No model.)

*To all whom it may concern:*

Be it known that I, WILLIAM LYNCH, of Wallkill, in the county of Ulster and State of New York, have invented new and useful Improvements in Gearing for Mowers and Reapers, of which the following is a full, clear, and exact description.

My invention relates to an improvement in mowers and reapers, and has for its object to transmit power from the drive-wheels to the cutter-bar in a direct and simple manner, dispensing with the ratchet attachments now in use, and wherein when turning a curve both wheels will operate and all side draft when on said curve be entirely overcome.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a front elevation of my device attached to a mower, the master-wheel being broken away to show the construction; and Fig. 2 is a central vertical section through the line *x x* in Fig. 1. Fig. 3 is a plan view, partly broken away, of the master-wheel.

In the construction and application of my device I cause the right-hand wheel, 1, of a mower to be rigidly attached to the main axle 2, and upon the said axle, a distance from the opposite end, I key a bevel-gear, 3, the teeth thereof being made to face in the direction of the left-hand wheel, 4.

I now provide a master-wheel, 5, to transmit motion to the cutter-bar, and construct the said wheel with an outer annular projection, 6, and provide it with openings 7 and 8 in its web, arranged in alignment with each other. The inner face of this wheel is usually formed with an annular recess, 9, the outer wall of which recess is provided with an internal gear, 10, adapted to mesh with a pinion attached to and constituting a part of the mechanism operating the cutter-bar. The wheel 5, instead of being formed with an internal gear, may be provided with a bevel-gear, or have teeth cut in its outer periphery, or may be of any preferred construction for making connection with the mechanism of the cutter-bar; but I prefer the construction shown as being best adapted for use with the ordinary form of mower. Within each of the openings 7 and 8 of the master-wheel I journal two bevel-pinions, 11 and 12, upon rods 13, passing through opposite radial apertures in the annular projection 6 of said wheel, the one pinion 11 being larger than the other pinion, 12, and both preferably in one casting. The master-wheel 5 thus constructed is mounted loosely upon the axle 2, the larger bevel-pinion, 11, meshing with the bevel-gear 3, keyed to said axle.

The left-hand wheel, 4, provided with a bevel-gear, 14, attached to its inner face, is now passed over the axle 2 and secured to turn thereon, the said bevel-gear 14 being of a diameter to mesh with the smaller pinions 12, journaled in the master-wheel, the said pinions 12 being so journaled in said master-wheel that they extend beyond the outer face thereof only. The relative diameters of the gears and pinions are controlled by the length of the cutter-bar used, as they act directly to balance said bar, and therefore aid in removing any side draft. In the accompanying drawings I illustrate one form of mechanism that may be employed in transmitting the power from the master-wheel to the cutter-bar 15, which consists in a horizontal plate, 16, through suitable bearings on which the axle 2 loosely passes. In depending arms at the rear outer corner of the plate 16 are journaled a bevel-gear, 17, and pinion 18 on the same shaft, the pinion 18 being adapted to mesh with the gear 10 of the master-wheel, and, receiving motion therefrom, transmits the same to the cutter-bar 15, through the gear 17, a bevel-pinion, 19, a longitudinal shaft, 21, journaled in said plate 16, an eccentric, 20, on said shaft, and a connecting-rod, 22, uniting the said eccentric with the cutter-bar. Thus while the master-wheel is loosely mounted on the axle 2 it is virtually keyed thereto by the engagement of the gear 14 of the wheel 4 with the small bevel-pinion 12 and of the gear 3 with the pinion 11, power being transmitted to the master-wheel from the wheels 1 and 4 through the said bevel-gears 3 and 14 and the pinions 11 12, the latter being relatively stationary with respect to each other when the machine while cutting grass or grain is moving forward in a straight line, but being carried bodily around by the axle and said wheels 1 and 4. During the movement of the machine the side draft on the finger-bar, which is proportionate to its length, must be overcome, and this is effected by so gearing up the wheels 1 and 4 that the ease with which the wheel 1 communicates its power to the master-wheel, and therefore the ease with which it will move forward over the ground, is greater than that of wheel 4 in proportion to the amount of side draft to be overcome. To accomplish this I make the pinion 12, with which the gear 14 meshes, of such size that the pitch-line of said pinion and gear is some little distance within that of gear 3 and pinion 11, while the said pinion 12 is on the same shaft and close to pinion 11.

The advantage which the bevel-gear 3 has over the bevel-gear 14 is in acting upon a pinion having a diameter greater in proportion to that of gear 3 than the diameter of the pinion 12 is in proportion to the diameter of the gear 14, and having the correspondingly-increased leverage in turning the bevel-pinion 11, and this increased leverage is equal to the distance between the two pitch-lines, which will be made proportionate to the side draft to be overcome.

Having thus fully described my invention, I claim as new, and desire to secure by Letters Patent—

1. The combination, with an axle having one drive-wheel fast thereto, a drive-wheel loosely mounted on the axle, a gear fast on said wheel, and a gear fast on the axle, of a master-wheel loosely mounted upon the axle between said gears, and two pairs of pinions journaled in said master-wheel and engaging the aforesaid gear-wheels, the pinions of each pair being integral or connected and of different diameters, the pitch-line of the smaller pinions of each of said pairs and the gears with which they mesh being within the pitch-lines of the larger pinions and the gears with which they mesh, substantially as shown and described, and for operation as set forth.

2. In a mower or reaper, the combination, with the axle 2, the drive-wheel 1, keyed thereto, and the drive-wheel 4, loose thereon and provided with a bevel-gear, 14, secured to its inner face and journaled on said axle, of the loose master-wheel 5, carrying the pairs of integral bevel-pinions 11 and 12, the one of greater diameter than the other, the fixed bevel-gear 3 on the axle, the pitch-line of the pinion 12 and gear 14 being within the pitch-lines of the gear 3 and pinions 11, and means for connecting said master-wheel with the cutter-bar, substantially as shown and described, and for the purpose herein set forth.

3. In a reaper or mower, the combination, with the axle 2, a drive-wheel, 1, keyed thereto at one end, a second drive-wheel, 4, having a bevel-gear attached to its inner face and journaled at the other end of the axle, and a bevel-gear, 3, keyed to said axle between said drive-wheels, of a master-wheel, 5, provided with an annular projection, 6, and openings 7 and 8, and the pairs of integral bevel-pinions 11 and 12, of different diameters, journaled in said projection, the pitch-line of the pinions 12 and gear 14 being within the pitch-line of the gear 3 and pinion 11, together with means for transmitting power from said master-wheel to the cutter-bar, substantially as shown and described, and for the purpose herein set forth.

WILLIAM LYNCH.

Witnesses:
GEORGE B. RUE,
JOHN WRIGHT.